United States Patent [19]
Jackson

[11] 4,366,056
[45] Dec. 28, 1982

[54] FILTER HAVING A FIXED STRAINER
[75] Inventor: Philip Jackson, Paris, France
[73] Assignee: E. Beaudrey & Cie, Paris, France
[21] Appl. No.: 231,629
[22] Filed: Feb. 5, 1981
[30] Foreign Application Priority Data
  Mar. 3, 1980 [FR] France .............................. 80 04679
[51] Int. Cl.³ ........................................... B01D 29/04
[52] U.S. Cl. ............................. 210/435; 210/497.01; 210/512.1
[58] Field of Search ............ 210/349, 437, 456, 512.1, 210/435, 497.01
[56] References Cited
U.S. PATENT DOCUMENTS
  2,302,116  11/1942  Gill .................................. 210/512.1

FOREIGN PATENT DOCUMENTS
  2355544  3/1978  France .

Primary Examiner—Ivars C. Cintins
Attorney, Agent, or Firm—Charles E. Brown

[57] ABSTRACT

A filter particularly for use with industrial waters includes a substantially cylindrical filter housing an inlet pipe inclined on its axis and an axial outlet pipe. A fixed strainer is arranged in the filter housing and communicates with the outlet pipe. Inside the strainer is a substantially conical deflector having a nose which is directed towards the outlet pipe. At least one fin, and, in practice, at least one longer fin and at least one shorter fin extends radially between the deflector and the strainer.

10 Claims, 3 Drawing Figures

FILTER HAVING A FIXED STRAINER

BACKGROUND TO THE INVENTION

The present invention relates to a filter comprising a substantially cylindrical housing, inlet means leading into the housing peripherally thereof, outlet means located axially of the housing at one end thereof, and a strainer located within the housing and having an internal space communicating with the outlet means.

Filters of this type are commonly used for filtering industrial waters and in particular circulation waters intended for cooling many kinds of installation, for example steam turbine condensers, and their purpose is to retain, in addition to any inert debris, organisms, such as shellfish or algae, which are capable of proliferating downstream in the installations supplied, to the detriment of the operation of the latter, if the debris has not been removed beforehand.

The present invention relates more particularly, but not exclusively, to those of this type in which the filter housing has a spiral wall, as described, for example, in U.S. Patent Application Ser. No. 806,929, now U.S. Pat. No. 4,276,171.

In a filter of this type, an advantageous result of the spiral profile of the wall of the filter housing, in conjunction with the inclination of the inlet pipe, is a systematic sweeping of the strainer by the inflow, which prevents the debris and organisms to be retained from depositing on this strainer and directs them towards a specific collection zone from which they are periodically removed by purging.

In the filters of this type, provision is usually made to equip the internal space of the strainer with a substantially conical deflector, the nose of which is directed towards the outlet pipe, in order to regulate the streams and to balance the flow passing through the strainer, in the most homogeneous manner possible over the entire length of the latter, consequently modifying the passage area available to this flow along a generatrix of the strainer.

In fact, and this is also the case in filters with an inclined inlet pipe, even if the wall of the filter body does not have a spiral profile but, has a circular profile coaxial with that of the strainer, the axial arrangement of the outlet pipe, in opposition to the lateral arrangement of the inlet pipe, tends to favour an increase in the flow through the strainer in that zone of the strainer which is closest to the outlet pipe, to the detriment of that zone of this strainer which is furthest from the outlet pipe.

Hitherto, a smooth deflector has usually been employed.

Although the filters with a fixed strainer and a deflector of this kind have proved satisfactory, and can still prove satisfactory, they exhibit various disadvantages, which are as follows.

Firstly, despite the presence of the deflector, the balancing of the flow over the entire length of the strainer does not take place in a totally satisfactory manner, and it is not rare to observe, in the zone of the filter closest to the outlet pipe, streams travelling with excess velocity, that is to say streams which, because they take a path, in the filter, which is shorter than that followed by the average streams passing through the filter, possess a velocity which is greater than the velocity of the average streams.

Moreover, the rotation to which these streams are subjected in the filter, around the strainer, is inopportunely perpetuated downstream of the filter.

Further, because of this rotation, an unstable vortex can inopportunely be set up on the nose of the deflector, and this has effects on the installations downstream, in particular if, for example in the case of an exchanger, such installations comprise tube plates.

These hydraulic deficiencies together result not only in an increase in the pressure losses due to the filter, but also, if appropriate, in the production of vibrations which are capable of affecting both the filter itself and the installations which it supplies.

An object of the present invention is to provide a filter in which these disadvantages are minimised or even eliminated.

SUMMARY OF THE INVENTION

According to the present invention there is provided a filter, in particular for industrial waters, comprising a substantially cylindrical filter housing, inlet means leading into the housing peripherally thereof, outlet means located axially of the housing and at one end thereof a fixed strainer located within the housing and having an internal space communicating with the outlet means, a substantially conical deflector located inside the strainer and converging towards the outlet means, and at least one fin extending radially between the deflector and the strainer.

Several fins may be provided in a star arrangement, and these fins may be of two different types.

Preferably there is at least one longer fin which extends approximately over the entire length of the deflector, and at least one shorter fin which only extends over a portion of the length of the deflector.

The longer fin, which can optionally be divided into two, may be at right-angles to the inlet means, and its function and effect, as confirmed by experiments, are to ensure an equal distribution of the flow over the entire length of the strainer, and to prevent the creation of eddy currents, which always cause perturbations, in the dead or virtually dead zone which nevertheless unavoidably originates inside the strainer, in the zone located along the generatrix where the inlet means is preferably tangential to the strainer.

The shorter fin or fins used, of which there may be three, and which only extend over approximately half the length of the deflector, taken from the convergent end of the deflector, have the purpose, as also confirmed by experiments, of breaking the rotation of the stream inside the strainer, at the cost of a frictional pressure loss which is minimal on account of their reduced length.

By themselves, the fins used in this way cause pressure losses by means of friction, as already mentioned above for the shorter fins.

However, taking into account the harmonisation of the stream which derived from the fins, the recovery of part of the kinetic energy of rotation of the stream which the fins make it possible to ensure, and the minimisation of the local excess velocities which is derived from the fins, the fins opposing the formation of veins which are preferential for the flow, the net balance of pressure losses due to the filter according to the invention is positive.

In fact, and experiments make it possible to establish this unambiguously, the filter according to the invention ensures a net decrease in pressure losses of more than 20% of the total, relative to a comparable prior art filter, so that as seen by the installations downstream, the filter according to the invention behaves as well as a simple bend from the point of view of the pressure losses.

Preferably, at its end opposite the outlet pipe, the deflector has at least one opening, forming a water intake, and its convergent end also has, axially, at least one opening in the direction of the outlet means.

As a result, by means of its interior volume, the deflector is capable of ensuring a flow of water from its divergent to its convergent end and, in the event of the appearance of a local pressure reduction at the convergent end due to eddy currents, the water feed to the corresponding zone by the flow advantageously prevents, therein, the formation of a vortex, which always generates perturbations.

The deflector make it possible to advantageously harmonise the streams, to avoid the local excess velocities, to break the eddy currents, to prevent the formation of vortices and hence, overall, to reduce the pressure losses and the possibilities of generating any vibrations causing perturbations.

BRIEF DESCRIPTION OF THE DRAWINGS

An embodiment of the present invention will now be described by way of example and with reference to the accompanying drawings in which.

DESCRIPTION OF THE PREFERRED EMBODIMENT

Figure 1:
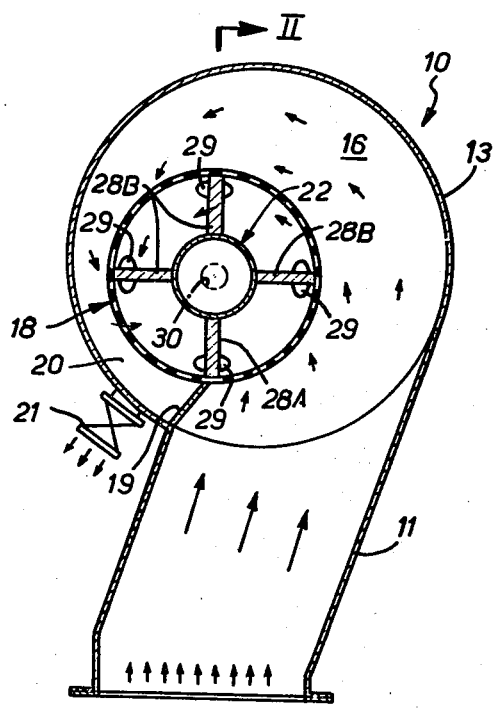
FIG. 1 is a view in cross-section of a filter according to the invention along the broken line I—I of FIG. 2.

These figures show a filter of the type described in U.S. Patent Application Ser. No. 806,929, now U.S. Pat. No. 4,276,171, mentioned above.

The filter comprises a substantially cylindrical filter housing 10 which has at its periphery, an inlet pipe 11 inclined on its axis, and, at one of its ends, an axial outlet pipe 12.

The filter housing 10 comprises a peripheral wall 13 to which the inlet pipe 11 is connected approximately tangentially. The inlet pipe 11 extends from an end wall 14 defining an axial opening 15 from which the outlet pipe 12 extends, and, from a solid end wall 16.

A fixed strainer 18 is arranged in the filter housing 10 and, in the illustrative embodiment shown, this fixed strainer 18, which is substantially cylindrical and of a circular cross-section, extends from the solid end wall 16 of the filter housing 10 to the open end wall 14 and is connected to the wall 14 at its periphery defining the opening 15.

The interior space of the strainer thus communicates with the outlet pipe 12.

Perferably, but not obligatorily, the peripheral wall 13 of the filter housing 10 forms a spiral volute around the fixed strainer 18, that is to say that its profile corresponds to that of a spiral.

In order to simplify the drawings, however, the peripheral wall 13 has been shown in the figures as having a circular cross-section, with an overal off-centring relative to the axis of the strainer 18 and hence to that of the pipe 12.

Inside the filter housing 10, a retaining wall 19, which is at right-angles to the generatrix of the strainer 18 which is circumferentially furthest from the inlet pipe 11, forms, with the strainer 18 and the wall 13 of the filter housing 10, a debris recovery box 20 which, for the discharging of the debris which accumulates therein, is capable of systematic purging, for example under the control of a valve 21.

Inside the strainer 18, a deflector 22 is arranged, which is substantially conical and the convergent portion of which is directed towards the outlet pipe 12.

In practice, this deflector comprises a substantially frustoconical barrel 24. At the divergent end of the barrel 24 which is remote from outlet pipe 12, a fixing flange 25 is connected to the barrel 24 by a hollow 26. At the convergent end of the barrel 24 which is close to the outlet pipe 12, a rounded nose 23 is provided.

At least one fin 28 extends radially, between the deflector 22, and the strainer 18.

There are several fins 28 and these are of two different types: There is at least one longer fin 28A which extends approximately over the entire length of the deflector 22, and at least one shorter fin 28B which only extends over a portion of the length of the deflector 22.

Preferably, whether they be longer fins 28A or shorter fins 28B, the fins 28 are firmly fixed to and carried by deflector 22, and, as shown, these fins 28 and the deflector 22 extend into the outlet pipe 12, by extending axially slightly beyond the strainer 18.

Radially, the fins 28 extend from the deflector 22 to the strainer 18.

There is at least one fin 28 at right-angles to the inlet pipe 11, and this is a longer fin 28A.

The longer fin 28A extends approximately over the entire length of the deflector 22, from the nose 23 to the flange 25 of the deflector, with the exception of the terminal part of the nose 23.

The longer fin 28A, which is the only longer fin in the illustrative embodiment shown, but which could be divided into two, extends at right-angles to the generatrix of the strainer 18 to which the retaining wall 19 is furthermore connected.

The shorter fins 28B, of which there are three in the illustrative embodiment shown, and which, with the longer fin 28A, are uniformly distributed in a circle around the deflector 22. Each extend over approximately half the length of this deflector 22, taken from the nose 23 of the deflector, with the exception, as above the longer fin 28A, of the terminal part of the nose 23.

Furthermore, at its base, that is to say at its end opposite the outlet pipe 12, the deflector 22 has at least one opening 29, and, preferably a plurality of such openings 29 uniformly distributed in a circle, and the nose 23 of the deflector 22 is axially provided with an opening 30.

Figure 2:
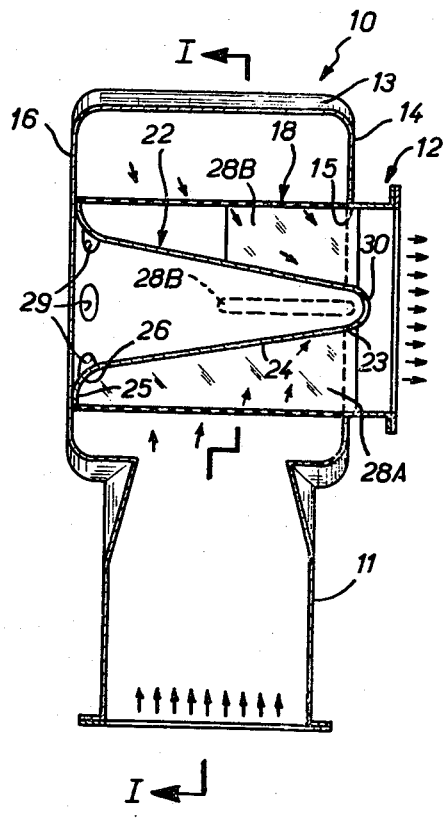
FIG. 2 is a view in axial section, along the line II—II of FIG. 1.
Figure 3:
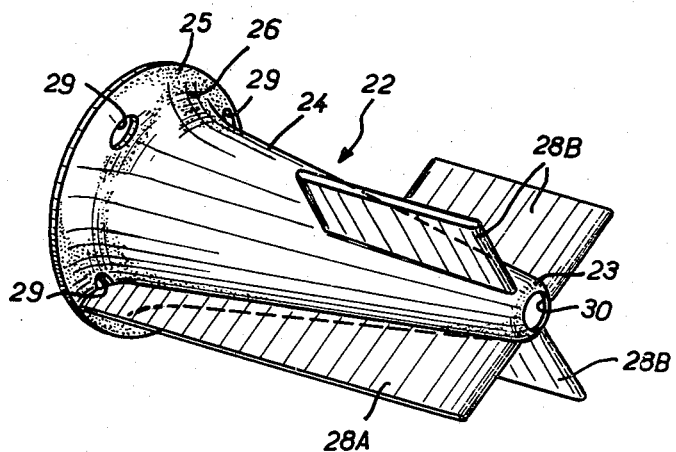
FIG. 3 is a view in perspective, on a different scale of the deflector of the filter shown in FIGS. 1 and 2.

The water which flows through the inlet pipe 11 into the filter housing 10, in the direction of the arrows of FIGS. 1 and 2, is caused to rotate about the strainer 18, but, after passage through the strainer, the fins 28 cause the flow to stabilise by breaking its rotation, before it is discharged through the outlet pipe 12.

Moreover, these fins 28, and in particular the longer fin 28A, ensure as homogeneous a distribution as possible of the throughput of this flow entering over the entire length of the strainer 18, by avoiding the development of preferential stream veins in the region of that end of the strainer 18 which is closest to the outlet pipe 12.

Together with the retaining wall 19, the longer fin 28A furthermore advantageously opposes the formation of eddy currents in that zone of the strainer 18 which is closest to the inlet pipe 11.

Further, as mentioned above, by axially feeding the zone located in the immediate vicinity of the nose 23 of the deflector 22, a fraction of the flow treated, which passes through the openings 29 at the base of this deflector and passes axially through the deflector, prevents a possible pressure reduction in this zone from being able to give rise to any vortex.

The present invention encompasses any modified embodiment, in particular as regards the number and the exact length of the fins used, and/or the exact profile of the wall 13 of the filter body 10.

Moreover, it is within the scope of the present invention to longitudinally divide the internal space of the strainer 18, and/or that of the filter body 10 around the strainer 18, into successive compartments by means of transverse partitions.

I claim:

1. An industrial water filter, comprising a substantially cylindrical filter housing, inlet means extending peripherally into said housing, outlet means located axially of said housing and at one end thereof, a fixed generally cylindrical strainer located within said housing and having an internal space communicating with said outlet means, a substantially conical deflector located inside said strainer and converging towards said outlet means, and at least one fin extending radially in the path of water passing through said strainer between said deflector and said strainer from said strainer to said deflector and axially of said outlet.

2. A filter according to claim 1, comprising at least one longer fin which extends approximately over the entire axial length of the deflector, and at least one shorter fin which extends over a portion of the axial length of the deflector.

3. A filter according to claim 2, wherein a shorter fin extends over approximately half the axial length of the deflector.

4. A filter according to claim 2, comprising a plurality of shorter fins uniformly distributed about a circle.

5. A filter according to claim 1, wherein at least one fin extends at right-angles to the inlet means, and approximately over the entire axial length of the deflector.

6. A filter according to claim 1, wherein the fins are firmly fixed to the deflector.

7. A filter according to claim 1, wherein the deflector and the fins extend into the outlet means.

8. A filter according to claim 1, wherein the deflector comprises a divergent end in the form of a fixing flange and a convergent end in the form of a rounded nose.

9. A filter according to claim 8, wherein the divergent end and the convergent end of the deflector are each provided with at least one opening.

10. A filter according to claim 1, comprising a retaining wall at right-angles to that generatrix of the strainer which is circumferentially furthest from the inlet means, which wall forms a recovery box with the strainer, wherein a fin extends at right-angles to the generatrix, and approximately over the entire axial length of the deflector.

* * * * *